United States Patent
Aaron et al.

(10) Patent No.: US 10,623,724 B2
(45) Date of Patent: Apr. 14, 2020

(54) ADAPTIVE DISPLAY ENVIRONMENT FOR DYNAMIC APPLICATIONS

(71) Applicant: International Business Machines Corporation, Armonk, NY (US)

(72) Inventors: Andrew S. Aaron, Ardsley, NY (US); Hariklia Deligianni, Alpine, NJ (US); David O. S. Melville, New York, NY (US); Mark E. Podlaseck, Kent, CT (US); Hyun Kyu Seo, Elmsford, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/654,283

(22) Filed: Jul. 19, 2017

(65) Prior Publication Data

US 2019/0028689 A1 Jan. 24, 2019

(51) Int. Cl.
*H04N 13/366* (2018.01)
*G06F 3/01* (2006.01)
*G06K 9/00* (2006.01)
*G06F 3/041* (2006.01)
*H04N 13/39* (2018.01)

(52) U.S. Cl.
CPC .......... *H04N 13/366* (2018.05); *G06F 3/017* (2013.01); *G06F 3/041* (2013.01); *G06K 9/00362* (2013.01); *H04N 13/39* (2018.05)

(58) Field of Classification Search
CPC .. H04N 13/366; H04N 13/39; H04N 13/0468; H04N 13/049; G06F 3/017; G06F 3/041; G06K 9/00362
See application file for complete search history.

(56) References Cited

U.S. PATENT DOCUMENTS

| | | |
|---|---|---|
| 2006/0071135 A1 | 4/2006 | Trovato |
| 2009/0153472 A1 | 6/2009 | Bloem et al. |
| 2012/0019438 A1 | 1/2012 | Liao |
| 2013/0195204 A1 | 8/2013 | Reznik et al. |
| 2014/0049563 A1* | 2/2014 | Tobin ...................... G06F 3/012 345/649 |
| 2014/0176424 A1 | 6/2014 | Hung et al. |
| 2015/0235084 A1 | 8/2015 | Cho et al. |
| 2015/0264339 A1* | 9/2015 | Riedel ................ G02B 27/2235 348/54 |

(Continued)

FOREIGN PATENT DOCUMENTS

WO 2014115937 A1 7/2014

*Primary Examiner* — Stephen G Sherman
(74) *Attorney, Agent, or Firm* — Cantor Colburn LLP; Anthony Curro (57) ABSTRACT

A system, computer program product and computer-implemented method for presenting data. The system includes a sensor that obtains a measurement related to a viewing parameter of a viewer in the environment, a presentation surface that provides data for viewing by the viewer, and a processor. The viewing parameter of the viewer indicates the viewer's ability to perceive the data. The processor determines the viewing parameter of the viewer from the obtained measurement and dynamically alters a presentation parameter of the presentation surface based at least in part on the viewing parameter of the viewer.

20 Claims, 7 Drawing Sheets

(56) References Cited

U.S. PATENT DOCUMENTS

| | | | | |
|---|---|---|---|---|
| 2015/0334808 | A1* | 11/2015 | Hack | A61M 21/00 |
| | | | | 315/297 |
| 2016/0316186 | A1* | 10/2016 | Krishnakumar | G06F 3/044 |
| 2018/0114353 | A1* | 4/2018 | Champion | G06T 15/005 |
| 2018/0235471 | A1* | 8/2018 | Jeong | G06K 9/00362 |

* cited by examiner

ADAPTIVE DISPLAY ENVIRONMENT FOR DYNAMIC APPLICATIONS

BACKGROUND

The present invention relates generally to display environments, and more specifically, to systems, methods and computer program products for providing a display environment that dynamically adapts a presentation to a viewer.

Meetings between individuals in a work place can be performed by assembling people in a room and displaying information on a presentation surface such as a chalkboard, a whiteboard, a monitor or a vertical surface illuminated by a projector. These presentation surfaces are fixed in space, usually because they are mounted on walls, etc. Such methods are not always suitable to each person at the meeting, as some people may sit in a location near the back with a bad view or bad sound, others may be seated at an angle, and others still may speak a different language that the rest of the group, for example. In addition, these technologies establish viewing for a group of people and cannot be tailored to each viewer's viewing experience. As a result, the user experience and the cognitive meaning of the data becomes limited by the display area of the presentation room.

SUMMARY

Embodiments of the present invention are directed to a computer-implemented method for presenting data. A non-limiting example of the computer-implemented method includes receiving, using a processor, a measurement of a viewer in order to determine a viewing parameter of the viewer that affects the viewer's ability to perceive the data; dynamically altering, using the processor, a presentation parameter of a presentation surface based at least in part on the viewing parameter of the viewer; and presenting, using the presentation surface, the data to the viewer.

Embodiments of the present invention are directed to a system for data presentation. A non-limiting example of the system includes: a sensor that obtains a measurement related to a viewing parameter of a viewer in the environment; a presentation surface that provides data for viewing by the viewer; and a processor that determines the viewing parameter of the viewer from the obtained measurement and dynamically alters a presentation parameter of the presentation surface based at least in part on the viewing parameter of the viewer.

Embodiments of the invention are directed to a computer program product for data presentation, the computer program product comprising a computer readable storage medium having program instructions embodied therewith. The program instructions are executable by a processor to cause the processor to perform a method. A non-limiting example of the method includes: receiving a measurement of a viewer in order to determine a viewing parameter of the viewer that affects the viewer's ability to perceive the data; dynamically altering a presentation parameter of a presentation surface based at least in part on the viewing parameter of the viewer; and presenting, using the presentation surface, the data to the viewer.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of the aspects of the invention, one or more embodiments of the invention address the above-described shortcomings of the prior art by providing a system and method for presenting data to a participant or viewer in a meeting in a way that suits the particular viewing parameters of the viewer. The presentation system can be provided in a room or enclosed space and can include a plurality of presentation surfaces. A presentation surface can be a display, display screen, monitor, television, holographic display, etc., that provides a visual signal to the viewer. The presentation surface may further include or refer to loudspeakers which may provide an audio presentation to the viewer, either on its own or in concert with a visual presentation. The system can change various presentation parameters of the presentation surface. A presentation parameter can include, but is not limited to, a height of the presentation surface, a proximity of the presentation surface to the viewer, an orientation of the presentation surface, a size of data presented at the presentation surface, a brightness of the presentation surface, a color of the data at the presentation surface, a volume of an audio presentation, and a selection of the presentation surface for data presentation. The presentation parameter is selected in order to accommodate a viewer by observing various viewing parameters of the viewer. Such viewing parameters can include, but are not limited to, a height of the viewer (including whether the viewer is sitting or standing), a location of the viewer, an orientation of the viewer, a primary language of the viewer, an ability of the viewer to clearly see data on the presentation surface (viewer's eyesight), etc. The viewing parameter can also be an affective viewing parameter that indicates a state of the viewer, such as a level of awareness of the viewer, a level of distraction of the viewer, confusion on the part of the viewer, etc. Such affective viewing parameters can be determined using facial recognition software in embodiments of the invention. The system changes the presentation parameters in order to provide data to the viewer most suitable to the viewer's current viewing state. Information on a first display can be provided to first viewer using a first mode of presentation that is suited to the first viewer. Meanwhile, information on a second display can be provided to a second viewer using a second mode of presentation suited to the second viewer. As the viewer moves within the environment, the system dynamically changes the presentation parameters by which the data is being presented in order to accommodate the viewer. Additionally, changes with respect to the context of a conversation between participants can be used to change the presentation. For example, detecting a change from a general discussion of a topic to a more specific discussion can be used to change information displayed at a presentation surface.

The above-described aspects of the invention address the shortcomings of the prior art by providing a data presentation system that detects viewing parameters of the viewer and changes the presentation parameters of the presentation surface in order to reduce or remove environmental hindrances to the viewer's ability to comprehend data being presented at the presentation surface. The system can therefore make adjustments at a presentation surface that facilitate understanding of the data by the viewer. For example, the system can change a height or orientation of a presentation surface in order to accommodate the height and viewing angle of the viewer. As the viewer moves through the room, the system can dynamically move the location and orientation of the presentation surface or dynamically move the data to another presentation surface that better accommodates the location and viewing angle of the viewer. The system can also monitor the viewer for signs that indicate a level of awareness of the viewer. For example, sensors of the apparatus can determine whether a viewer is squinting and make adjustments to the size of data being presented or of the location of a presentation surface to the viewer in order to improve the visual presentation. Additionally, the sensors may determine when the viewer is confused, curious, distracted, or has fallen asleep. By removing external hindrances in a communication channel between the system and the viewer, the system improves the viewer experience as well as the data absorption and retention by the viewer. The system further allows the viewer to interact viewer with the system in order to change a presentation parameter to accommodate the viewer. The system change data being presented when a context of a conversational between viewers changes.

Figure 1:
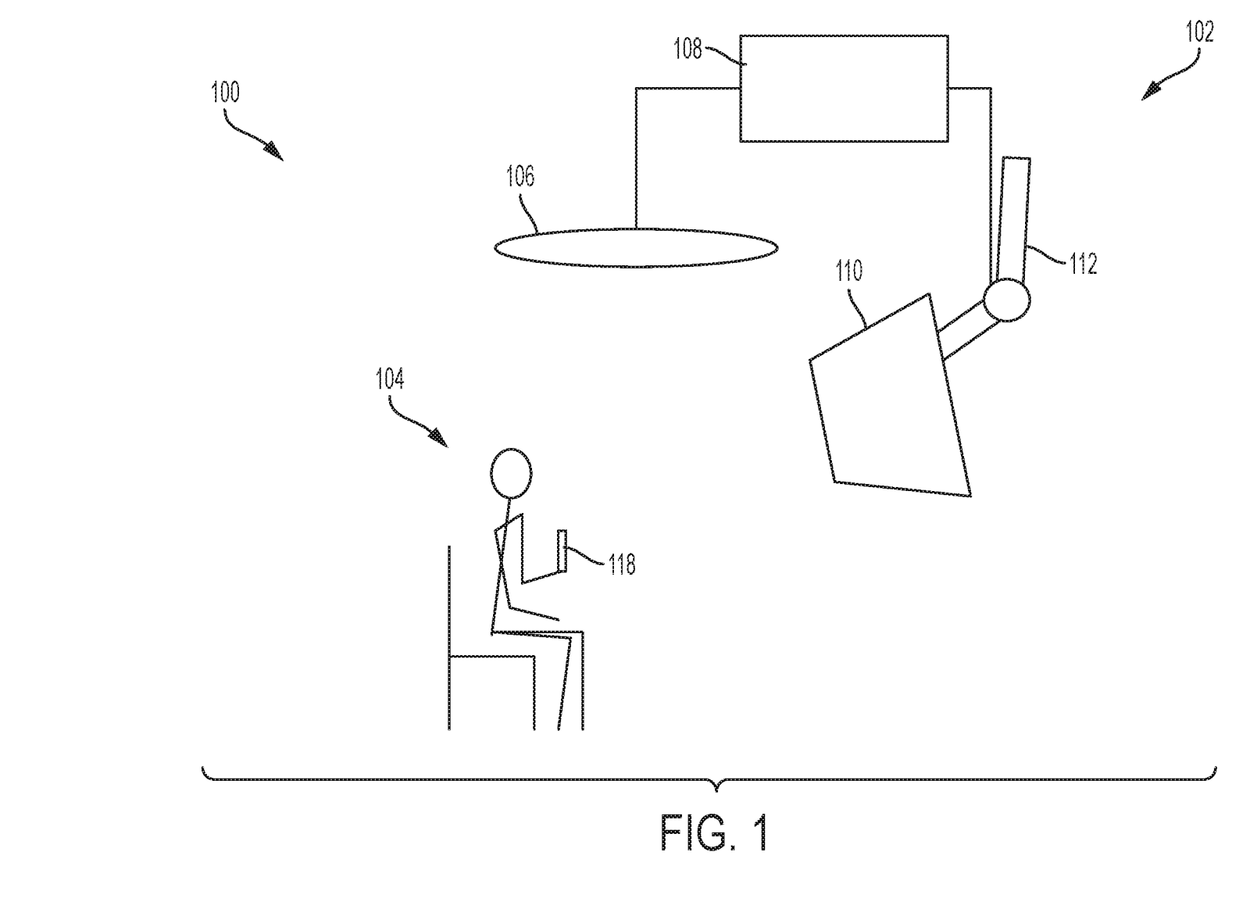
FIG. 1 depicts an environment that includes a system for presenting data to a viewer according to embodiments of the present invention.

Turning now to a more detailed description of aspects of the present invention, FIG. 1 depicts an environment 100 that includes a system 102 for presenting data to a viewer 104 according to embodiments of the invention. The system 102 includes one or more sensors 106 that obtain one or more measurements regarding a viewing parameter of the viewer 104, a presentation surface 110 for displaying data or information to the viewer 104, and a processor 108 that determines the viewing parameter of the viewer 104 from the obtained one or more measurements and changes a presentation parameter for displaying data at the presentation surface 110 in order to suit the viewing parameter of the viewer 104. The presentation parameter can include, for example, a height of the presentation surface 110, an orientation of the presentation surface 110, a size of fonts or images at the presentation surface 110, a language in which the data is displayed, panel brightness, contrast, volume level of an audio presentation, etc. Although only one presentation surface 110 is shown in FIG. 1, multiple presentation surfaces 110 can be included in the system 102 in embodiments of the invention. When the system 102 includes multiple presentation surfaces 110, the processor 108 can select a presentation surface 110 for displaying the data based at least in part on the viewing parameter of the viewer 104, such as the location, viewing direction, height, etc. of the viewer 104. Each presentation surface 110 is supported by a support arm 112 which may be a robotic arm that can be maneuvered by processor 108.

The one or more sensors 106 can include sensors that determine a viewing parameter of the viewer 104, such as a location, orientation, height, etc., of the viewer. The sensors 106 can include spatial detection sensors, such as acoustic sensors, LIDAR, thermal imaging, video recorders, cameras and digital cameras, etc. Additionally, the presentation surface 110 may be touch sensitive, thereby allowing the viewer 104 to interact with the processor 108 by touching the presentation surface 110 at a specified location or making a gesture at the presentation surface 110.

The presentation surface 110 and support arm 112 are connected to the processor 108. The processor 108 can include a cognitive computer platform to perform a method for the automatically adaptive environment that understands the context of a discussion of the viewer's understand of the presented material and enhances human perceptual and collaborative abilities of the viewer or viewers by, for example, adjusting the presentation surface and/or providing language translation between people of different languages. The system 102 can provide a full 360 degree immersion for the viewers, and is cognitive-enabled for group collaboration using speech recognition, gesture recognition, and affective computing. Affective computing includes determining an inner or emotional state of the viewer by reading the viewer's facial expressions.

The presentation surface 110 and support arm 112 can include various sensors, cameras, etc., embedded therein for determining a height and/or orientation of the presentation surface 110 as well as proximity of the presentation surface 110 to the viewer. The one or more sensors 106 may further include microphones for listening to the viewer 104 in order to respond to verbal commands from the viewer 104. Additionally, the viewer 104 can carry a data entry device 118 that transmits a gesture of the viewer 104 to the processor 108. The data entry device 118 can be a glove or other article worn over the hand or on the body of the viewer 104. Alternatively, the data entry device 118 can be a hand-held device. The data entry device 118 can include accelerometers and other sensors that sense a movement of the data entry device 118 throughout space or with respect to a selected location. The data entry device 118 can thereby determine a gesture made by the viewer 104 and signal the processor 108 of the determined gesture. The determination of the gesture can also be made by the processor 108.

The processor 108 can execute programs that can be used to determine the viewing parameters of the viewer 104. The processor 108 may further run facial recognition programs on the viewer 104 in order to determine the viewer's understanding of the data being presented to the viewer 104. For example, the processor 108 can determine that the viewer 104 is squinting while looking at the presentation surface 110 and can then perform an action (by changing presentation parameters) that makes reading the data easier for the viewer 104. Such action can include moving the presentation surface 110 closer to or further away from the viewer 104 to locate a position with respect to the viewer 104 at which the viewer 104 is no longer squinting. Alternatively, the processor 108 can change a size of the data at presentation surface 110 until the viewer 104 is no longer squinting. Further adjustments can be made to a brightness of the presentation surface 110 and/or to color used in the presentation, for example. Alternatively, the processor 108 can select to present the data on the other or different presentation surface 110, making necessary adjustments to the presentation parameters of the other presentation surface to display the data to the viewer 140.

The processor 108 can further execute programs that can be used to determine an alertness of the viewer 104. The processor 108 may determine that the viewer 104 is losing interest or has fallen asleep and can provide a signal to bring the viewer 104 back to full awareness. Also, facial expressions can be read to determine confusion, distracted viewing on the part of the viewer, etc. and make necessary adjustments, such as slowing down the presentation or bringing the attention of the viewer back to the presentation.

FIG. 1 shows the viewer 104 sitting in a chair. In this scenario, the processor 108 can lower the presentation surface 110 to a comfortable viewing height for the seated viewer 104. If the participant 104 to stands up, the system can raise the presentation surface 110 to the new eye level of the viewer 104. If the viewer 104 moves around, the processor 108 can dynamically adjust the presentation parameters of the presentation surface 110 to accommodate the viewer 104 for any location, viewing direction, etc., of the viewer 104.

In other embodiments, the system 102 can accommodate a language of the viewer 104. The processor 108 can execute programs to determine a primary language of the viewer 104 by listening to the speech of the viewer 104. The processor 108 can change a language in which data is presented based at least in part on the determination of the language of the viewer 104. For a scenario in which two or more languages are being spoken, the processor 108 can present the data in the two or more languages.

Figure 2:
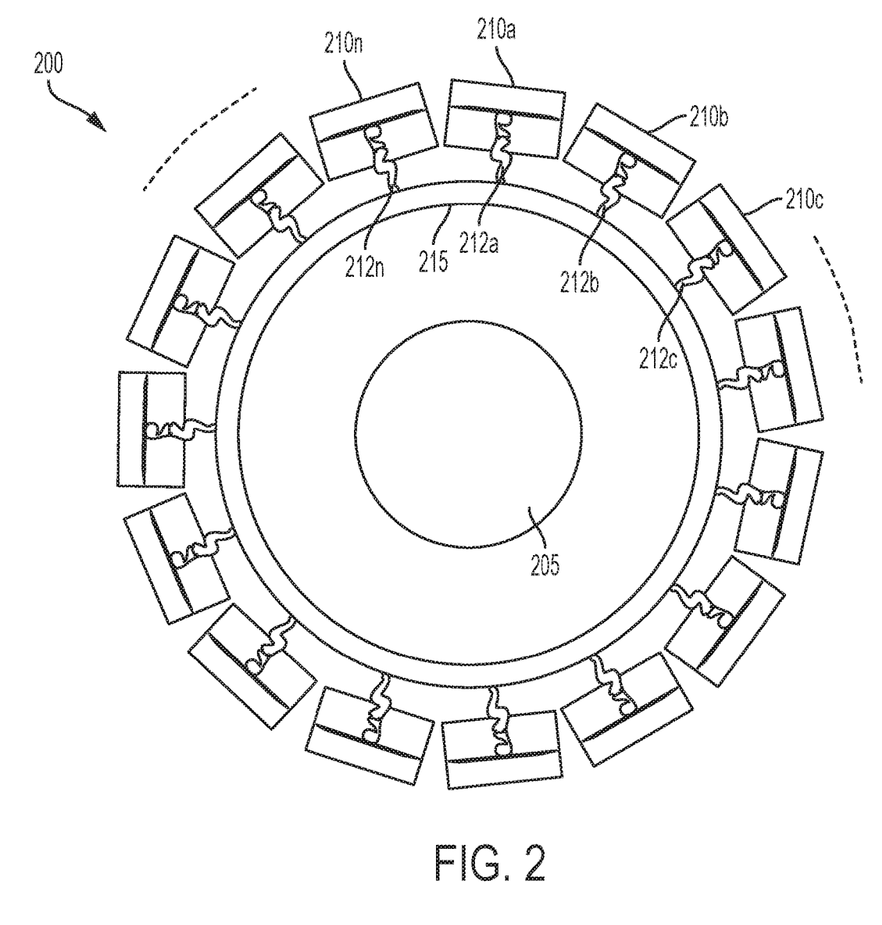
FIG. 2 depicts a top view of an illustrative presentation system in embodiments of the present invention.

FIG. 2 shows a top view of an illustrative presentation system 200 in embodiments of the invention. The system 200 includes a plurality of presentation surfaces 210a, 210b, 210c, . . . , 210n. The presentation surfaces 210a, 210b, 210c, . . . , 210n are arranged in a ring so as to provide a viewing surface for any direction that a viewer may be looking as well as to provide a panoramic view. A support structure 215 is attached at ceiling of a meeting room, conference room, etc. In one or more embodiments, the support structure 215 is in the shape of a ring. The presentation surfaces 210a, 210b, 210c, . . . , 210n are suspended from the support structure 215 via their respective support arms 212a, 212b, 212c, . . . , 212n. Support arms 212a, 212b, 212c, . . . , 212n can be articulated individually in order to move a selected presentation surface (e.g., presentation surface 210a) to a selected location and orientation that is within the range of it respective support arm 212a. In various embodiments, the processor 108 controls the movement of the support arms 212a, 212b, 212c, . . . , 212n.

Figure 3:
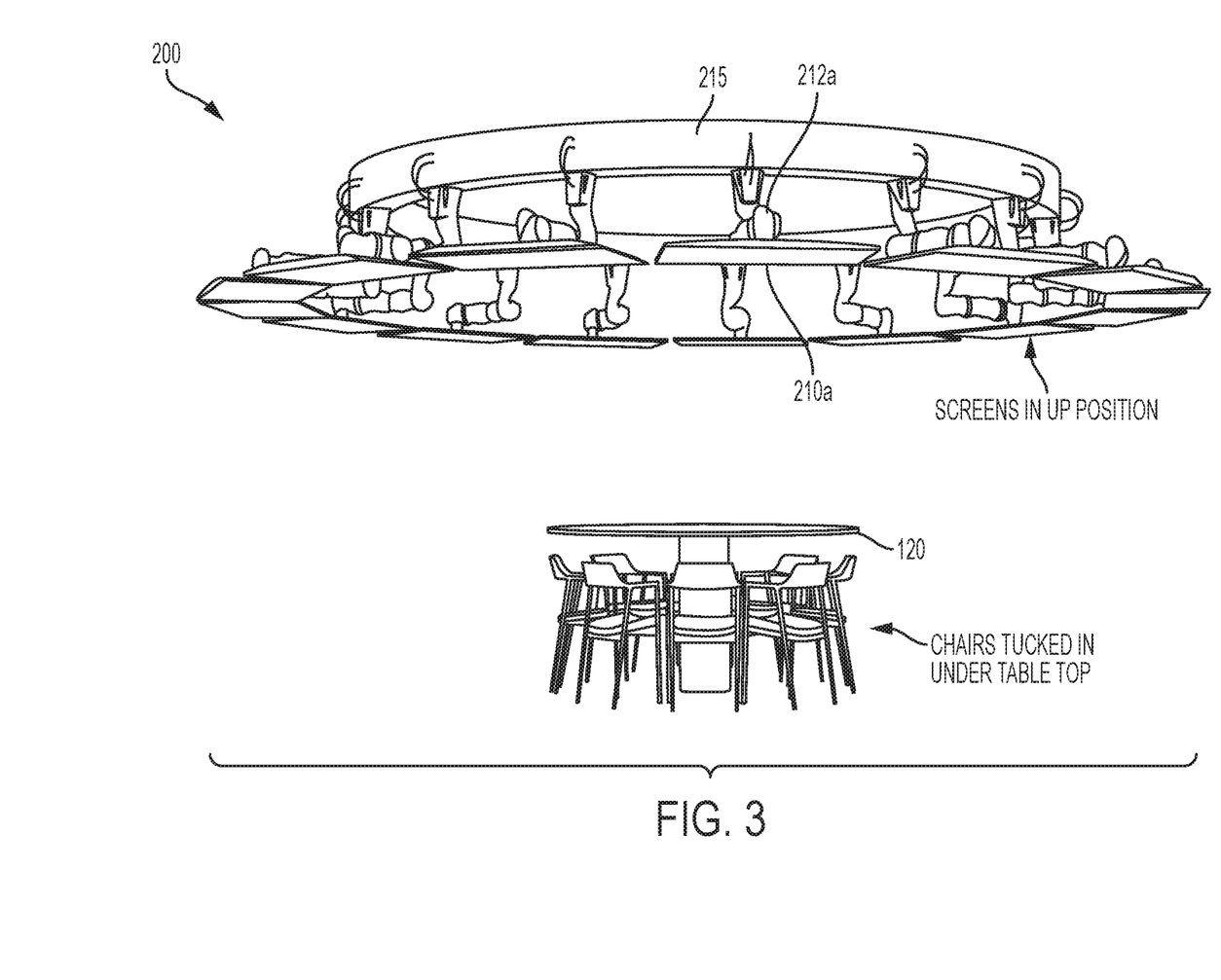
FIG. 3 depicts a perspective view of the presentation system in a default setting in embodiments of the present invention.

FIG. 3 shows a perspective view of the presentation system 200 in a default setting. The presentation surfaces 210*a*, 210*b*, 210*c*, ..., 210*n* are shown as being in a substantially horizontal plane near a ceiling of the meeting room. In particular, the presentation surfaces are in a position that allows people to walk under them freely. During a presentation, one or more of the presentation surfaces can be lowered into a more or less vertical position. The particular configuration of the presentation surfaces 210*a*, 210*b*, 210*c*, ..., 210*n* can be selected to define a viewing area for a viewer or groups of viewers, such as a circular viewing area, auditorium style viewing area, etc.

Figure 4:
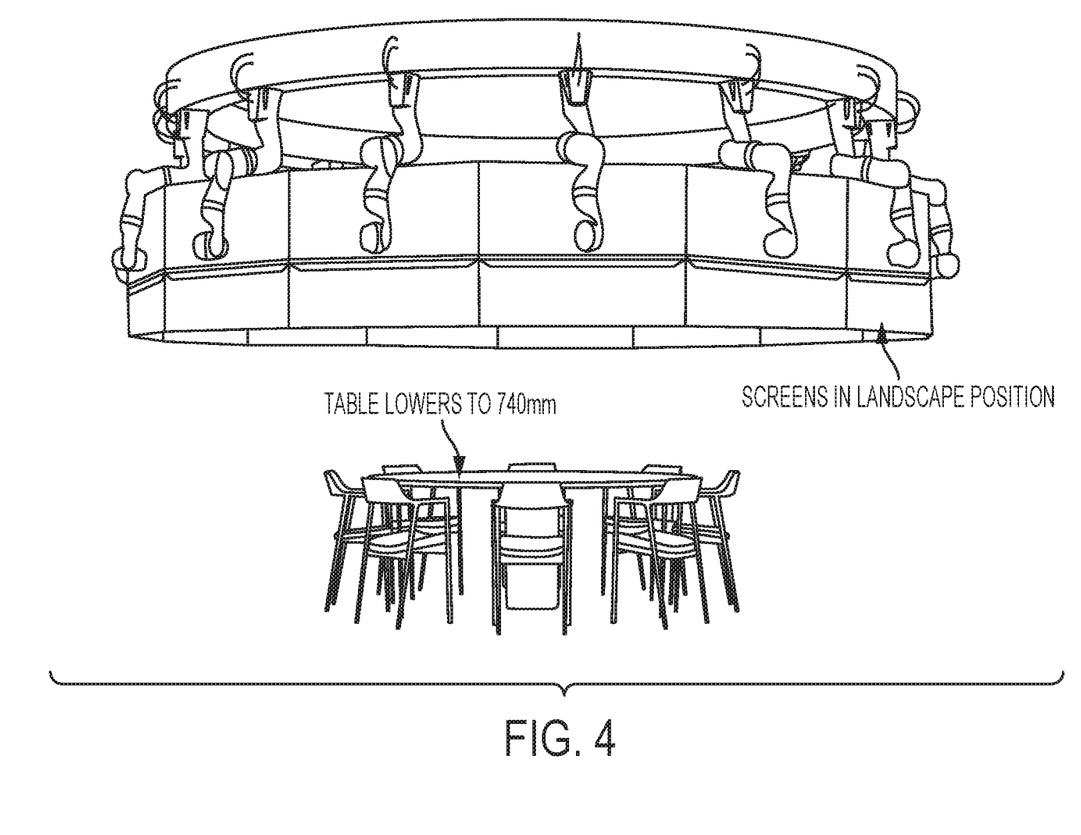
FIG. 4 depicts presentation surfaces of the presentation system lowered into a vertical position in order to form a ring in embodiments of the present invention.

As shown in FIG. 4, the presentation surfaces are lowered into a vertical position in order to form a ring around the viewers. The presentation surfaces are arranged in a landscape orientation and are end-to-end with each other so as to completely surround the viewing area, thereby providing a 360 degree immersion for the viewer.

Figure 5:
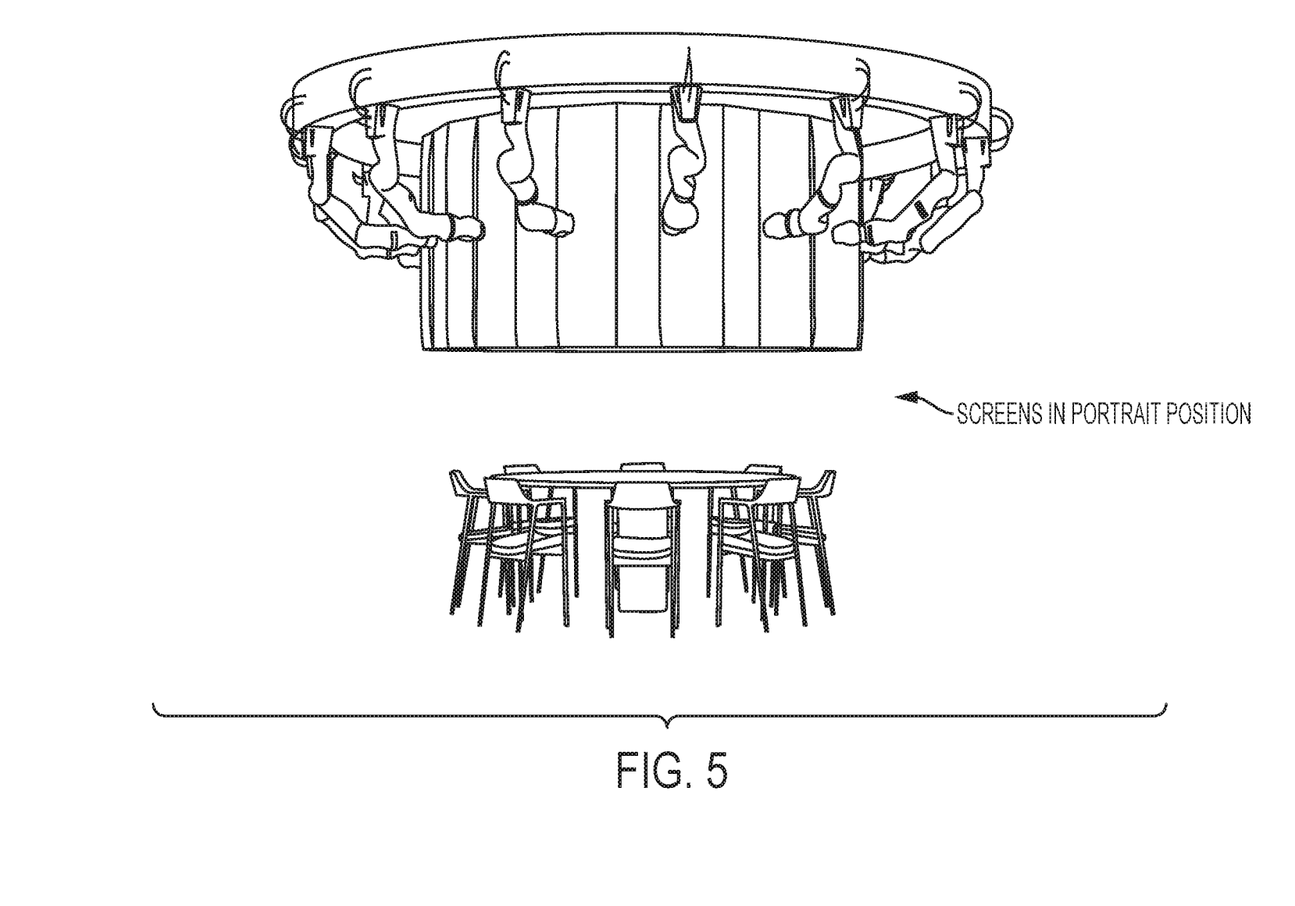
FIG. 5 depicts the presentation system wherein the presentation surfaces have been placed in a portrait orientation and are side-by-side each other to form a ring in embodiments of the present invention.

FIG. 5 shows the presentation system 200 in yet another operational mode of the invention in which the presentation surfaces have been placed in a portrait orientation and are side-by-side each other so as to form a ring around the center. The radius of the circle formed by the display panels in the portrait orientation is smaller than the radius of the circle formed by the display panels in the landscape orientation.

Figure 6:
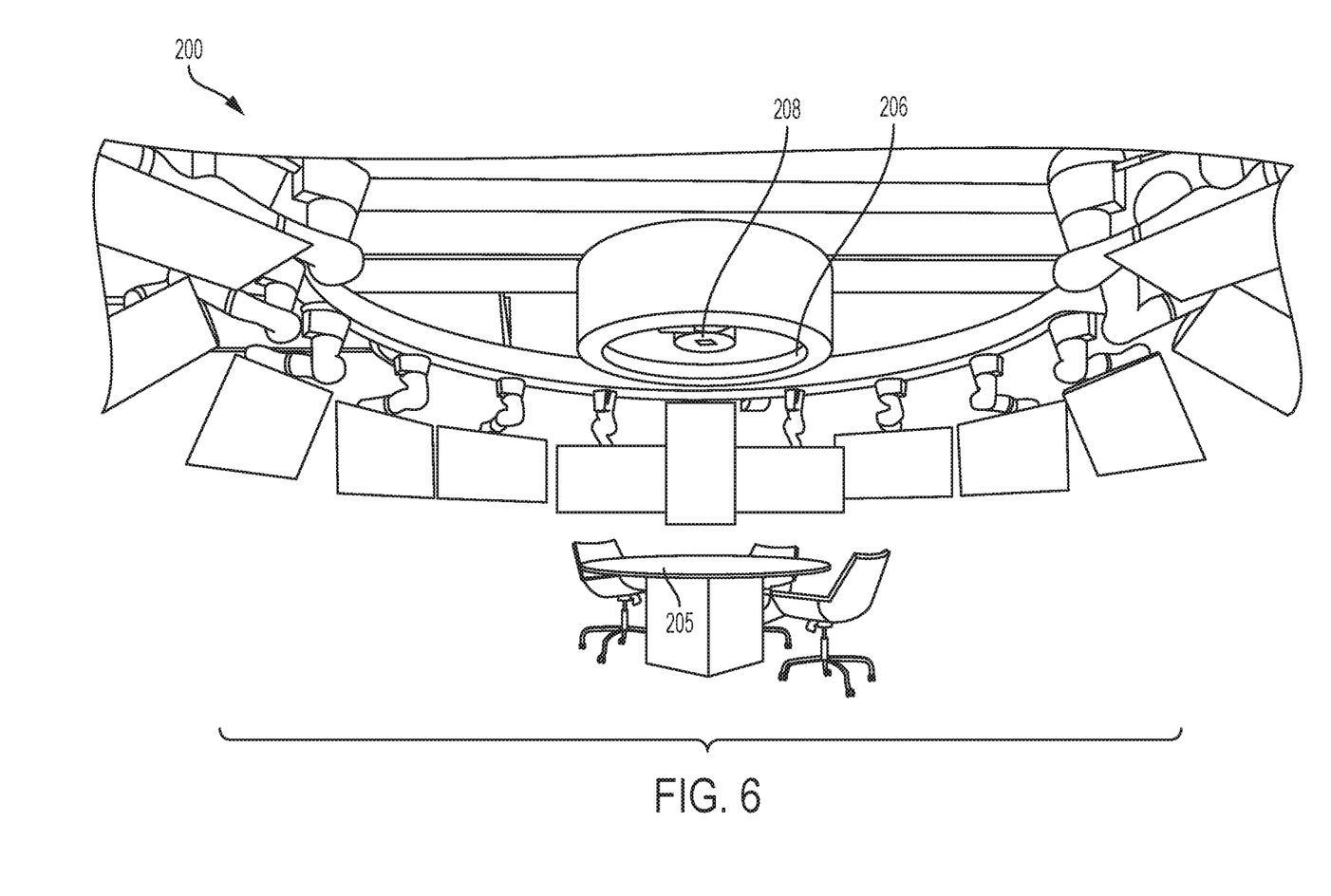
FIG. 6 depicts the presentation system in yet another mode of operation in embodiments of the present invention.

FIG. 6 shows the presentation system 200 in yet another mode of operation. The presentation surfaces are arranged in order to provide a semi-circle or suitable equivalent to provide viewing to viewers outside of a central circle. More particularly, the presentation surfaces are arranged to provide viewing to viewers in a traditional auditorium seating arrangement.

Referring to FIGS. 2-6, in various embodiments, the presentation system can include a table 205 or flat horizontal surface around which participants can sit. The table 205 can be raised or lowered based at least in part on a decision of the participants to either sit or stand. Additionally, by referring specifically to FIG. 6, a projector 208 can be disposed above the table 205. The projector 208 projects an image on the horizontal surface of the table 205. Sensors 206 above the table 205 determine a movement of a participant or viewer and react to the participant's motion. For example, the projector 208 may project an item at a selected location at the surface of the table 205 and sensors 206 may observe when the participant moves his or her hand or finger into the selected location in order to indicate selection of the item. A processor (such as processor 108 of FIG. 1) can then take an appropriate action based at least in part on the selection of the item. In various embodiments, the table 205 can be placed concentrically along an axis defined by the ringed support structure 115. In other embodiments, the table 205 can be in any shape and can be located at any selected location within the room.

Figure 7:
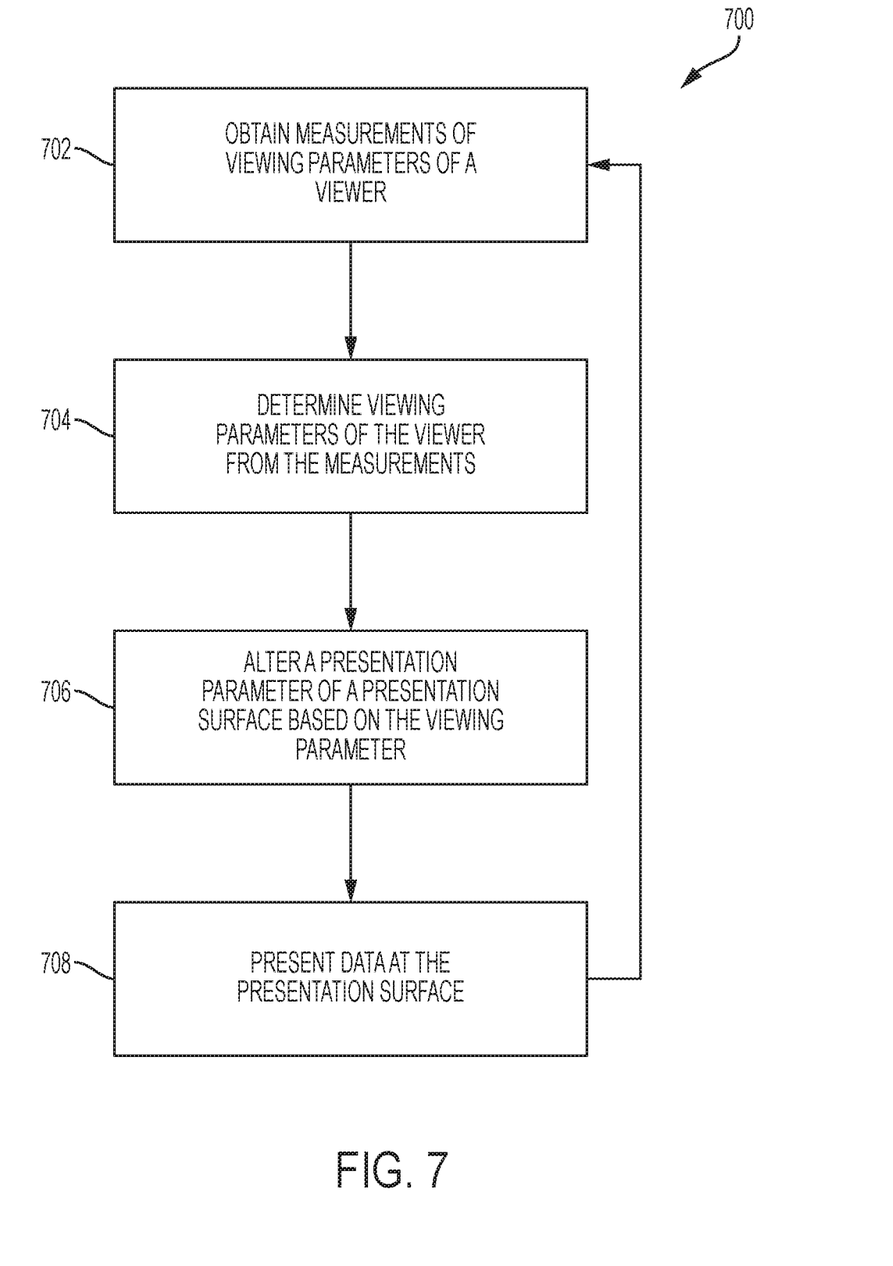
FIG. 7 depicts a flowchart illustrating a method of presenting data using the presentation system in embodiments of the present invention.

FIG. 7 shows a flowchart 700 illustrating a method of presenting data using the presentation system in embodiments of the present invention. In box 702, sensors take measurements of viewing parameters of the viewer. In box 704, a processor determines viewing parameters from the measurements. In box 706, the processor determines presentation parameters that optimally or maximally provide viewing of the data for the determined viewing parameters and alters a presentation parameter of a presentation surface accordingly. In box 708, data is presented at the presentation surface. The method loops back to box 702 to be able to continually monitor the viewer and to change presentation parameters as the viewing parameters change.

In various embodiments of the invention, the presentation system includes one or more presentation surfaces defining a viewing area, with the presentation surfaces being articulated by support arms that are moved by a processor. In other embodiments of the invention, the presentation system can include various holographic displays suspended from the support arms. Holographic displays can provide three-dimensional viewing which can be achieved by changed a refractive index of display materials or by manipulating a movement and/or angles of the displays. In yet another embodiment, the presentation system includes a table with a projected display for providing information on a surface of the table. In yet another embodiment, the presentation system is employed in a Cave Automatic Virtual Environment (CAVE). The CAVE includes an area, generally a cube-shaped area, formed by rear-projection displays that wall off the area. The CAVE is contained within a larger room that is darkened when the CAVE is in use. Within the CAVE, three-dimensional images or perspectives can be presented, and participants wearing special devices (e.g., glasses) synchronized with the display/projectors can walk around an object to study the object from all angles.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for presenting data, the method comprising:
reading, using facial recognition software run on a processor, a facial expression of a viewer to determine a level of understanding of the viewer of the data being presented at a presentation surface;
receiving, using the processor, a measurement of a viewer obtained using a light detection and ranging (LIDAR) sensor in order to determine a viewing parameter of the viewer that affects the viewer's ability to understand the data, wherein the viewer moves around a room and wherein the obtained measurement of the viewer includes at least user's location within the room and user's viewing direction;
dynamically altering, using the processor, a presentation parameter of the presentation surface based at least in part on the viewing parameter of the viewer to accommodate at least user's viewing location within the room and viewing direction; and
presenting, using the presentation surface, the data to the viewer when the facial recognition software determines that the altered presentation parameter of the presentation surface enhances the viewer's ability to understand the data.

2. The computer-implemented method of claim 1, wherein the viewing parameter of the viewer is selected from the group consisting of a height, a primary language, an age, a location, a gesture, and a facial expression.

3. The computer-implemented method of claim 1, wherein altering the presentation parameter further comprises one selected from the group consisting of adjusting a height of the presentation surface, adjusting a proximity of the presentation surface to the viewer, adjusting an orientation of the presentation surface, adjusting a size of data presented at the presentation surface, altering a brightness of the presentation surface, selecting a color of data at the presentation surface, adjusting a volume of an audio presentation, and selecting the presentation surface for data presentation.

4. The computer-implemented method of claim 1, wherein the at least one presentation surface includes a holographic display surface at an end of an adjustable support arm.

5. The computer-implemented method of claim 1 further comprising synchronizing a wearable device by the viewer with the presentation surface to provide a three-dimensional perspective of an object that can be observed throughout 360 degrees of viewing.

6. The computer-implemented method of claim 1 further comprising projecting an image onto a horizontal surface from a projector above the horizontal surface.

7. The computer-implemented method of claim 1, wherein the viewing parameter is an affective viewing parameter indicative of an internal state of the viewer.

8. A system for data presentation, comprising:
a presentation surface that provides data for viewing by a viewer;
a LIDAR sensor that obtains a viewing parameter of the viewer, wherein the viewing parameter affects a viewer's ability to understand data at the presentation surface;
a camera for obtaining a facial image of the viewer; and
a processor configured to:
determine, using facial recognition software, a level of understanding of a viewer of the data being presented at a presentation surface;
receive the viewing parameter of the viewer from the LIDAR sensor, wherein the viewer moves around a room and wherein the viewer parameter includes at least user's location within the room and user's viewing direction;
dynamically alter a presentation parameter of the presentation surface based at least in part on the viewing parameter of the viewer to accommodate at least user's viewing location within the room and viewing direction; and
present the data at the presentation surface to the viewer when the facial recognition software determines that the altered presentation parameter of the presentation surface enhances the viewer's ability to understand the data.

9. The system of claim 8, wherein the viewing parameter of the viewer is selected from the group consisting of a height, a primary language, an age, a location, a gesture, and a facial expression.

10. The system of claim 8, wherein the presentation parameter is selected from the group consisting of: a height of the presentation surface, a proximity of the presentation surface to the viewer, an orientation of the presentation surface, a size of data presented at the presentation surface, a brightness of the presentation surface, a color of data at the presentation surface, a volume of an audio presentation, and a selection of the presentation surface for data presentation.

11. The system of claim 8, wherein the presentation surface includes a holographic display surface at an end of an adjustable support arm.

12. The system of claim 8, wherein the processor adjusts the presentation parameter in order to reduce an effort required of the viewer to perceive the data.

13. The system of claim 8 further comprising a wearable device by the viewer that are synchronized with the presentation surface to provide a three-dimensional perspective of an object to the viewer that can be observed throughout 360 degrees of viewing.

14. The system of claim 8, further comprising a horizontal surface and a projector above the horizontal surface for projecting an image onto the horizontal surface.

15. A computer program product for data presentation, the computer program product comprising a computer readable storage medium having program instructions embodied therewith, the program instructions executable by a processor to cause the processor to:
receive a facial image of the viewer;
read a viewer's facial expression from the facial image to determine a level of understanding of a viewer of the data being presented at a presentation surface;
receive a measurement of a viewer obtained using a LIDAR sensor in order to determine a viewing parameter of the viewer that affects the viewer's ability to understand the data wherein the viewer moves around a room and wherein the obtained measurement of the viewer includes at least user's location within the room and user's viewing direction;
dynamically alter a presentation parameter of the presentation surface based at least in part on the viewing parameter of the viewer to accommodate at least user's viewing location within the room and viewing direction; and
present, using the presentation surface, the data to the viewer when the viewer's facial expression indicates that the altered presentation parameter of the presentation surface improves the viewer's ability to understand the data.

16. The computer program product of claim 15, wherein the viewing parameter of the viewer is selected from the group consisting of a height, a primary language, an age, a location, a gesture, and a facial expression.

17. The computer program product of claim 15, wherein dynamically altering the presentation parameter further comprising one selected from the group consisting of adjusting a height of the presentation surface, adjusting a proximity of the presentation surface to the viewer, adjusting an orientation of the presentation surface, adjusting a size of data presented at the presentation surface, altering a brightness of the presentation surface, selecting a color of data at the presentation surface, adjusting a volume of an audio presentation, and selecting the presentation surface for data presentation.

18. The computer program product of claim 15, wherein the presentation surface includes a holographic display surface attached to an end of an adjustable support arm.

19. The computer program product of claim 15 further comprising synchronizing a wearable device by the viewer with the presentation surface to provide a three-dimensional perspective of an object to the viewer that can be observed throughout 360 degrees of viewing.

20. The computer program product of claim 15 further comprising projecting an image onto a horizontal surface via a projector above the horizontal surface.

* * * * *